United States Patent [19]

Adachi

[11] Patent Number: 4,765,147

[45] Date of Patent: Aug. 23, 1988

[54] METHOD FOR FREEZING SAKE

[75] Inventor: Tamotsu Adachi, Kobe, Japan

[73] Assignee: Ozeki Sake Brewing Co., Ltd., Hyogo, Japan

[21] Appl. No.: 42,045

[22] Filed: Apr. 24, 1987

[51] Int. Cl.⁴ .............................................. F25D 25/00
[52] U.S. Cl. ......................................... 62/62; 62/407; 426/393; 426/592
[58] Field of Search ............... 426/384, 392, 393, 524, 426/592; 62/62, 60, 404, 407

[56] References Cited

U.S. PATENT DOCUMENTS

| | | | |
|---|---|---|---|
| 3,088,290 | 5/1963 | Zearfoss, Jr. | 62/62 |
| 3,647,472 | 3/1972 | Speech et al. | 426/592 |
| 3,718,007 | 2/1973 | Randrup | 62/380 |
| 4,547,372 | 10/1985 | Takeuchi et al. | 426/592 |

FOREIGN PATENT DOCUMENTS 101426 6/1973 Japan .
107974 1/1974 Japan .

*Primary Examiner*—Ronald C. Capossela
*Attorney, Agent, or Firm*—Birch, Stewart, Kolasch & Birch

[57] ABSTRACT

A method for freezing sake which comprises placing sake filled in containers in a refrigerator which is equipped with a strong cooling device and a fan device for continuous air flow and has ventilating spaces at side walls and floor of the freezer; and continuously flowing air with setting a temperature sensor in the refrigerator at 2 to 70° lower than a desired product frozen temperature, e.g., −20° C. so that sake becomes sherbet form wherein water in sake is frozen in spongy or needle form to embrace an alcohol containing part therein.

5 Claims, 1 Drawing Sheet

METHOD FOR FREEZING SAKE

FIELD OF THE INVENTION

The present invention relates to a method for freezing sake (a typical Japanese alcoholic beverage) to market sake in a frozen state having fresh taste and improved quality.

BACKGROUND OF THE INVENTION

In traditional sake brewing, a fermented product is filtered and then subjected to a heat treatment. This heat treatment is necessary to prevent putrefaction by hiochibacteria. Recently, in order to serve the fresh taste of sake without heat treatment to consumers, it has been proposed to subject sake to freezing instead of the heat treatment for preventing "hiochi" putrefaction, and to market it in a frozen state (see Japanese Patent Kokoku Nos. 48-18832 and 49-4389).

In the case of marketing frozen sake, the frozen state in a container when it is consumed is of importance. That is, it is necessary that frozen sake is quickly and uniformly thawed, and consumed in a uniform state of alcohol, water and other ingredients without any defect of taste.

When sake is frozen, in general, fine pieces of ice are formed at about $-15°$ C. In order to meet requirements of frozen storage, sake should be cooled to about $-20°$ C. and, at this temperature, much water is frozen and sake becomes a sherbet like state. At about $-40°$ C., more ice is formed and texture becomes harder, while alcohol is not frozen. Frozen sake is produced by filling the filtrate of a fermented product without heat treatment in containers and then subjecting them to freezing. Accordingly, when a temperature reaches to $-40°$ C. or lower, breakage of containers due to ice is increased, although it depends upon the material and shape of containers.

Then, freezing methods which can be applied to the production of frozen sake having the above characteristics should be studied.

Conventional freezing methods can be divided into quick freezing and slow freezing. However, the conventional methods are not suitable for freezing sake as explained below.

(1) Quick freezing

In general, conventional quick freezing is carried out by quickly freezing a product with a cooling medium e.g., liquid nitrogen of $-195°$ C. at a temperature lower than a pre-determined desired product temperature, e.g., $-20°$ C. However, sake contains much water and, upon freezing, it remarkably increases in volume due to formation of ice and, therefore, when a freezing temperature becomes lower, more increased head space volume in containers is required. In this regard, it is very difficult to provide increased head space volume of containers only to a product to be frozen from a practical viewpoint in this field. Then, when supercooling takes place, the content spouts out and further breakage of containers occurs. Therefore, it is difficult to use a cooling medium having a low temperature.

Further, when freezing is completed so quickly such as within 30 minutes, needle ice crystals are quickly formed toward the radial direction from the peripheral to the center of a container and a liquid portion having a high alcohol content remains in the center. Thus, separation of water and alcohol causes and appearance becomes whitish, which results in lack of refreshing feeling and less commercial value.

Furthermore, since sake contains 80 to 85% of water and has a large specific heat as that of water, freezing with a cooling medium such as liquid nitrogen is expensive.

Accordingly, conventional quick freezing is not suitable for sake freezing.

(2) Slow freezing

When sake is slowly frozen, water changes into small ice pieces and they gradually float up toward the upper portion of a container after a product temperature reaches to $0°$ C. or lower to form a mass of ice, and a liquid portion having a higher alcohol content remains at the lower portion. Thus, the product separates into two portions.

Such a product has bad appearance and less commercial value. Further, when it is consumed, the ice portion thaws slowly. Therefore, in many cases, only the remaining liquid portion wherein water content is lowered and ingredients are out of harmony is firstly consumed, and subsequently a portion having higher water content formed by thawing of ice is consumed, which results in bad taste and less commercial value.

In general, in the case of freezing sake in a refrigerator, cooling and air circulation are stopped when a temperature about a temperature sensor in the refrigerator reaches a desired predetermined termperature such as $-20°$ C. Therefore, air contacting with a product does not move and air is rather warmed by the product which is in the course of cooling, which results in lowering of cooling effect. In addition, a cooling device does not work again until almost all air in the refrigerator is warmed higher than the desired temperature by convection to actuate the sensor. As the result, cooling is carried out intermittently and is not suitable for freezing sake.

OBJECTS OF THE INVENTION

The main object of the present invention is to provide a suitable method for freezing sake which can produce frozen sake which has an improved commercial value in that it is quickly and uniformly thawed, and consumed in a uniform state of alcohol, water and other ingredients without any defect of taste.

This object as well as other objects and advantages of the present invention will become apparent to those skilled in the art from the following description with references to the accompanying drawings.

SUMMARY OF THE INVENTION

Figure 1:
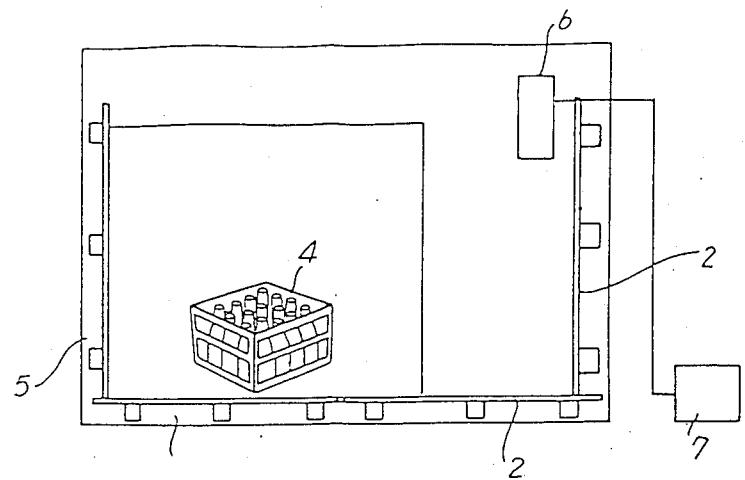
FIG. 1 is a schematic side view illustrating the inside of a refrigerator used in a preferred embodiment of the present invention.

According to the present invention, there is provided a method for freezing sake which comprises placing sake filled in containers in a refrigerator which is equipped with a strong cooling device and a fan device for continuous air flow and has ventilating spaces at side walls and floor of the refrigerator; and continuously flowing air with setting a temperature sensor in the refrigerator at $2°$ to $70°$ C. lower than a desired product frozen temperature so that sake becomes sherbet form wherein water in sake is frozen in the form of a spongy material or needles to embrace an alcohol containing part therein.

DETAILED EXPLANATION OF THE INVENTION

It has been found that, when the cooling rate of a product is controlled between those of the above quick freezing (1) and slow freezing (2), as the product temperature falls, fine particles of ice produced join to each other during floating up toward the upper portion of the container to form a spongy material uniformly embracing therein an alcohol containing part, and supercooling can be prevented. That is, in the method of the present invention, sake is frozen with continuously circulating strong air flow. Thereby, water in sake is frozen in spongy or needle form to uniformly embrace an alcohol containing part therein. Thus, the resulting frozen sake is quickly and uniformly thawed, and consumed in a uniform state of alcohol, water and other ingredients without any defect of taste.

Sake to be frozen is a conventional one and it is the filtrate of a fermented product without subjecting heat treatment. The filtrate is filled in containers such as 180–1800 ml glass bottles, plastic bottles, cans, etc.

The refrigerator used in the present invention may be a conventional one but, its cooling device such as a combination of cooling fans and a cooler compressor, etc. and a fan device should have at least 2 times greater performance than those of a conventional refrigerator. That is, it is preferred that the cooling device of the refrigerator has a performance of 30 to 100 Kcal/hour per 1 m$^3$ of the capacity of the refrigerator. Preferably, the fan device has performance of 2 to 10 m$^3$/min. per 1 m$^3$ of the capacity of the refrigerator.

In the method of the present invention, a desired product frozen temperature, i.e., a temperature to which the product should be cooled to meet requirements of frozen storage, can be −18° to −60° C., preferably, −20° to −40° C. For carrying out the method of the present invention, cold air at a temperature of lower than the desired product frozen temperature, e.g. −23° to −90° C., is blasted and circulated through products in the refrigerator with setting a temperature sensor in the freezer at 2° to 70° C., preferably, 2° to 30° C., more preferably, 2° to 5° C. lower than the desired product frozen temperature (−20° C.). By this, even if the cooling device is stopped, air continuously flows to continue cooling by air and thereby the product is quickly cooled without supercooling. On the other hand, even if air is warmed by the product, the temperature in the refrigerator is quickly elevated due to circulation of air and thereby a dwell period of the cooling device is shortened. When a cooling device has smaller power, the device should continue to work and further the cooling rate becomes slow.

Now, the refrigerator used in a preferred embodiment is illustrated with reference to the accompanying drawings.

Figure 2:
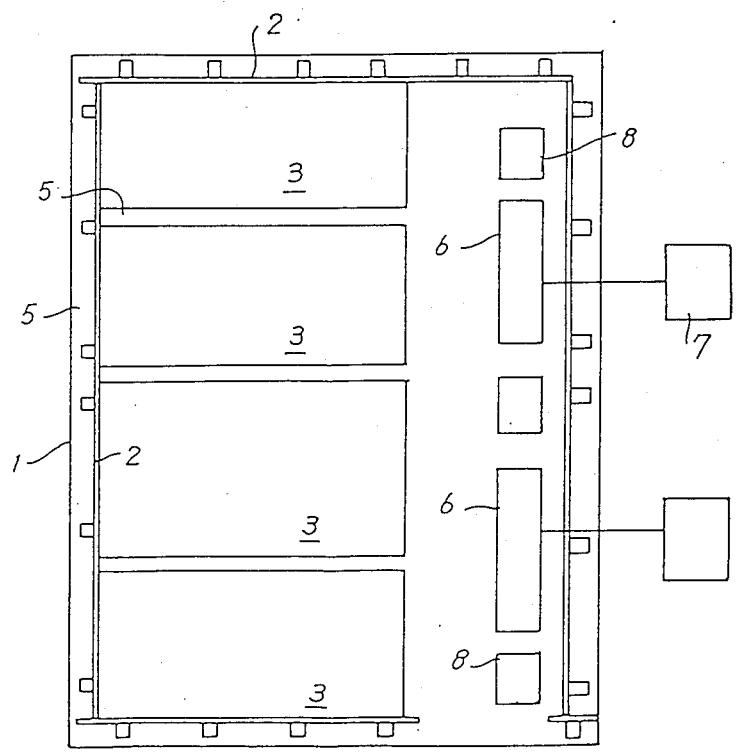
FIG. 2 is a schematic plan view illustrating the inside of the refrigerator of FIG. 1.

FIG. 1 is a schematic side view of the freezer and FIG. 2 is a schematic plan view thereof. The refrigerator has outer wall 1 defining inner space of the refrigerator and drainboard like partitions 2 are provided along the inside of outer wall 1. Product placing sections 3 are arranged inside of partitions 2 and baskets or boxes 4 which contain containers filled with sake are placed in the sections 3. There are ventilating spaces 5 between outer wall 1 and partitions 2 and cold air is past through spaces 5. The refrigerator is equipped with cooling fans 6 (for cooling), cooler compressors 7 and continuously driving ventilation fans 8. Optionally, fans 6 can play the same role as that of fans 8 and the latter may be omitted.

That is, even if the cooling device is stopped, it is possible to continuously work fans 6 by means of, for example, switching circuits and thereby they can play the role of a continuous ventilating device.

According to the method of the present invention, freezing is completed within, for example, 5 to 24 hours per 4,500 l of sake filled in 300 ml glass bottles, although it depends upon an amount of sake to be frozen.

The method of the present invention can be carried out on an industrial scale.

The following example further illustrates the present invention in detail but are not to be construed to limit the scope thereof.

EXAMPLE

A refrigerator as shown in FIGS. 1 and 2 was used. This refrigerator had an area of 26 m$^2$, 2.7 m in height and a capacity of 70 m$^3$ and equipped with 2 coolers each of which had a performance of 4,400 Kcal/hour and 3 continuous fan devices each of which had a performance of 110 m$^3$/min. Sake (4500 l) was filled in 300 ml glass bottles and the bottles were put in baskets and then the baskets were placed in the freezer wherein the temperature sensor was set at −25° C. Cold air of −25° to −28° C. was continuously circulated for 12 hours to freeze the sake. As the result, desired sherbet like frozen sake uniformly containing alcohol was obtained.

The invention being thus described, it will be obvious that the same way may be varied in many ways. Such modifications are not to be regarded as a departure from the spirit and scope of the present invention, and all such modifications are intended to be included within the scope of the following claims.

What is claimed is:

1. A method for freezing sake which comprises the steps of:
   producing sake according to conventional fermentation;
   introducing said sake into containers without subjecting it to any heat treatment;
   placing said containers in a refrigerator equipped with a cooling device and fan device for producing continuous air flow, said refrigerator having ventilating spaces at the side walls and floor;
   controlling the temperature in said refrigerator at 2° to 70° C. lower than the desired frozen sake temperature; and
   continuously contacting said sake with flowing air so that said sake takes the form of sherbert wherein the water in said sake is frozen in the form of a spongy material of needles to embrace an alcohol portion contained therein.

2. A method according to claim 1, wherein said cooling device has a performance of 30 to 100 Kcal/hour per 1 m$^3$ of capacity of the freezer.

3. A method according to claim 1, wherein said fan device has a performance of 2 to 10 m$^3$/min. per 1 m$^3$ of capacity of the refrigerator.

4. A method according to claim 1, wherein said desired frozen product temperature is −18° to −60° C.

5. A method according to claim 1, wherein said containers are 180–1,800 ml bottles.

* * * * *